(12) United States Patent
Knapp et al.

(10) Patent No.: US 6,229,435 B1
(45) Date of Patent: May 8, 2001

(54) OUTSIDE MIRROR COMMUNICATION SYSTEM

(75) Inventors: Robert C. Knapp, Coloma; Robert R. Turnbull, Holland; David J. Cammenga, Zeeland, all of MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/262,651

(22) Filed: Mar. 4, 1999

(51) Int. Cl.[7] .............................. B60Q 1/00; H04B 1/00

(52) U.S. Cl. ......................... 340/425.5; 340/310.01; 340/310.06; 340/825.72; 701/49; 307/10.1

(58) Field of Search .................. 340/310.01, 310.06, 340/425.5, 825.69, 825.72, 310.02, 310.07; 701/36, 49, 53; 307/10.1

(56) References Cited

U.S. PATENT DOCUMENTS

| | | | | |
|---|---|---|---|---|
| 4,907,222 | * | 3/1990 | Slavik | 307/10.1 |
| 4,926,158 | * | 5/1990 | Zeigler | 340/507 |
| 5,504,478 | | 4/1996 | Knapp | 340/825.69 |
| 5,798,575 | * | 8/1998 | O'Farrell et al. | 307/10.1 |
| 5,821,632 | * | 10/1998 | Normann et al. | 307/10.1 |
| 6,006,143 | * | 12/1999 | Bartel et al. | 701/36 |
| 6,056,410 | | 5/2000 | Hoekstra et al. | 359/603 |

\* cited by examiner

Primary Examiner—Donnie L. Crosland
(74) Attorney, Agent, or Firm—Price, Heneveld, Cooper, DeWitt & Litton; Brian Rees

(57) ABSTRACT

A system for transmission of information between the interior and exterior of a vehicle. A single bus (conductor or conductor pair) carries information between mirrors inside and outside the vehicle. The bus supplies power to the exterior mirror. When information is to be transmitted, this power is interrupted or modulated.

20 Claims, 3 Drawing Sheets

OUTSIDE MIRROR COMMUNICATION SYSTEM

FIELD OF THE INVENTION

The present invention relates to intra-vehicular communications systems. More particularly, the present invention relates to arrangements for communicating data between locations of the interior and the exterior of an automobile.

BACKGROUND

In order to reduce solar heating inside automobiles, many vehicular windows incorporate low-E metallic coatings. While this solution has been effective in solar control, it has the unfortunate side effect of RF shielding the interior of the vehicle. As a result, the effectiveness of RF-based systems, such as remote keyless entry, garage door openers, and tire pressure monitoring systems, is reduced.

In addition, bus systems, such as CAN and J1850 type systems, have been used to facilitate intra-vehicular communication. These bus systems are used, for example, to control outside mirror functions, such as mirror position, electrochromic dimming, and turn indicators. It is not desirable to provide access to the vehicle bus in the outside mirror, however, because such access may compromise vehicle security.

There is a need for a bi-directional communication system between the inside of the vehicle and the outside of the vehicle, and especially an outside mirror, which will accommodate a solution to the foregoing problems. Moreover, it has been found desirable to reduce as much as possible the number of wires between the inside of the vehicle and the outside mirrors.

SUMMARY OF THE INVENTION

One aspect of the present invention is directed to a mirror communication arrangement for use in a vehicle for communicating information between locations inside and outside the vehicle. A power conductor delivers electrical power to a first module, preferably a mirror module, located outside the vehicle. A control arrangement, responsive to a second module (which can also be a mirror module) located inside the vehicle, selectively modulates an amount of electrical power delivered to the first module. A transmitter arrangement inside the second module transmits information to the first module when the electrical power delivered to the first module is modulated.

According to another embodiment, the communication arrangement includes a power conductor configured and arranged to deliver electrical power to a first module located outside the vehicle. A transistor arrangement is responsive to a control signal and selectively interrupts or modulates the delivery of electrical power delivered to the first module. When power is so modulated, an optional capacitor, coupled to the first module, sustains electrical power to the first module. A transmitter arrangement located within a second module inside the vehicle transmits information to the first module when delivery of the electrical power is modulated. In one aspect, a DC or low frequency blocking and matching network isolates power and data signals from an electrochromic element used as an RF antenna within the first module. Preferably, the modules are mirror modules.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

These and other aspects and advantages of the present invention will become apparent upon reading the following detailed description and upon reference to the drawings, in which.

Figure 1A:
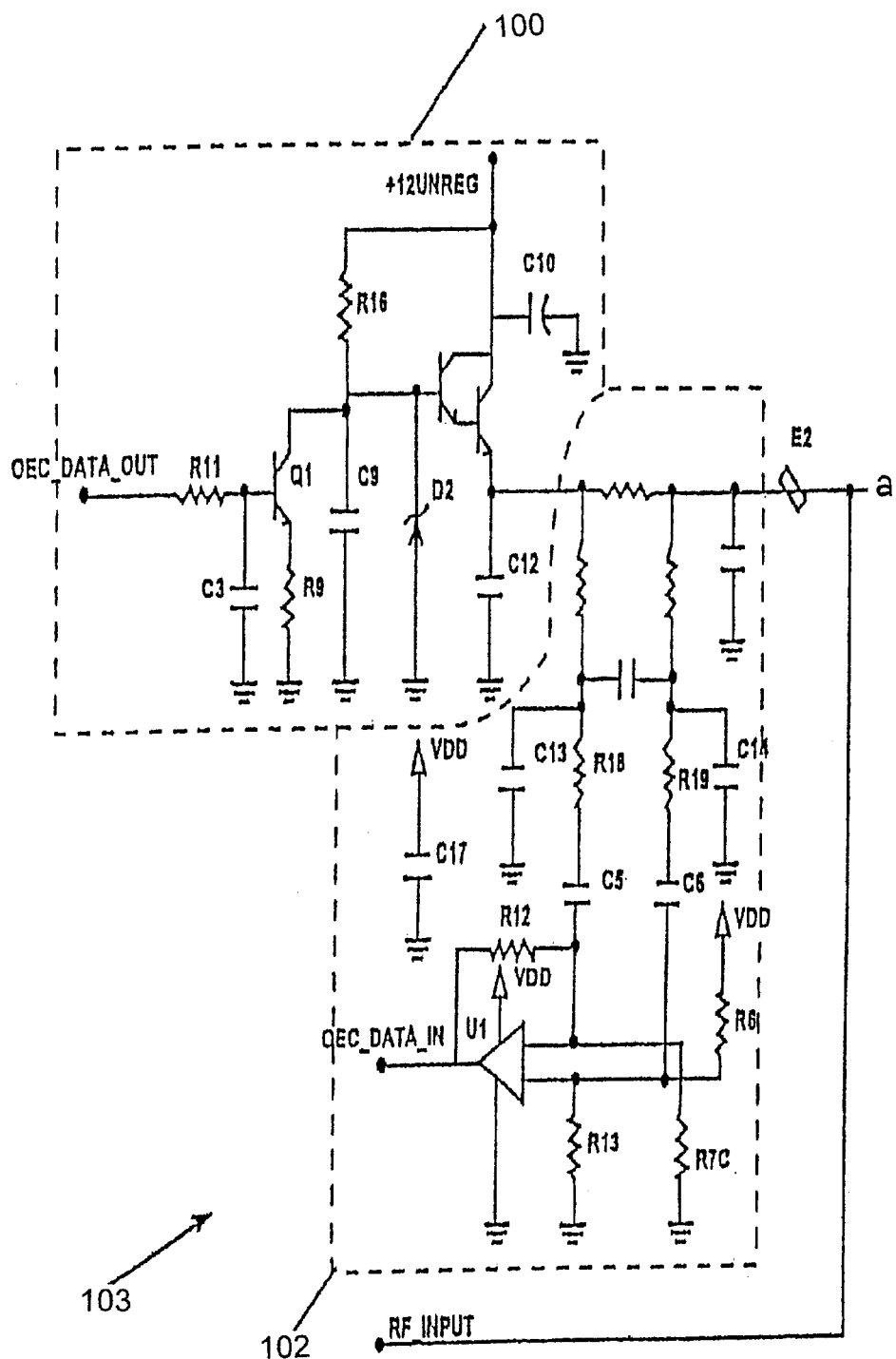
FIGS. 1a and 1b are a schematic diagram illustrating a mirror communication system according to a particular embodiment of the present invention.

The invention is amenable to various modifications and alternative forms. Specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to a variety of systems and arrangements for using outside electrochromic mirror elements as transmitting and receiving antennas. The invention has been found to be particularly advantageous for use in environments in which an automobile interior is RF shielded from the outside environment.

According to one aspect of the present invention, power and bidirectional data communication are provided over a single wire and ground pair to a module located in an outside mirror. By adding a DC or low frequency blocking and matching network, the power and communication wire pair can be combined with the transmission line connecting the outside mirror with an RF transceiver. Thus, power, bi-directional serial data, and bi-directional RF signals (if co-axial cable or other RF cable is used) may be simultaneously sent over the same wire.

According to one embodiment of the present invention, a transmitter and power supply are located in the inside rearview mirror housing (or any other convenient location within the vehicle interior). A microprocessor in the inside mirror interrupts or, preferably, modulates power to the outside mirror briefly to provide data transmission. When the power to the outside mirror is interrupted, a capacitor in the outside mirror provides needed power. In one embodiment, the power supply modulates between two levels, e.g., 6 V and 8 V, to provide data communication while maintaining a continuous supply of power to the outside mirror module. Any additional power needed by the outside mirror can be supplied by the capacitor.

This power supply and data transmission circuit also provides suppression of transient voltages present in automotive power systems, reducing the size and weight of the outside mirror electronics by eliminating the need for redundant protection circuitry.

In a first embodiment, transmission of data to the inside mirror is accomplished by means of a current loop. A current source in the outside mirror modulates the supply current drawn by the outside mirror module. Data is detected by a current sense amplifier in the inside mirror. If different modulation frequencies or methods are chosen for the transmissions to and from the inside mirror, simultaneous bidirectional communication is possible.

Figure 1B:
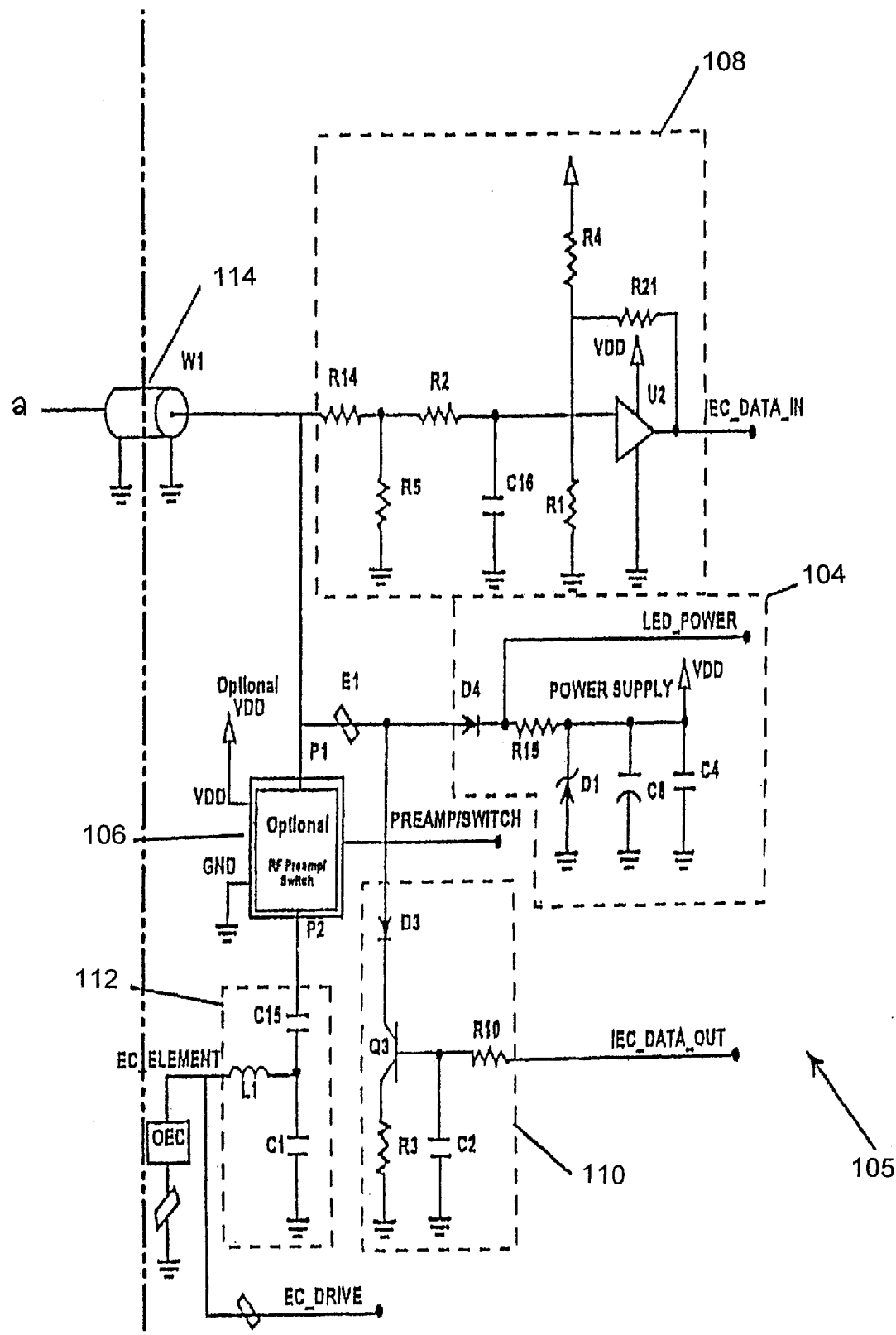

Referring now to the drawings, FIGS. 1a and 1b disclose a mirror communication system 103 and outside mirror circuit 105 according to one embodiment of the present invention. A power source 100, which includes transistors Q1 and Q2 provides regulated power to the outside mirror. Power is interrupted when an input signal drives the OEC_DATA_OUT line to a logic "HIGH" state.

Interrupting power creates a time window allowing data to be transmitted to and from the outside mirror. In order to detect transmissions from the outside mirror, a current sensing amplifier 102 acts as a receiver for receiving data transmitted by outside mirror circuit 105. This current sensing amplifier 102 includes a resistor R8, an operational amplifier U1, and associated circuitry. Ferrite beads E1, E2, and E3 or RF chokes in the power and data path isolate the RF signals from the rest of the circuitry and prevent signal loss.

In one implementation, a voltage regulator powers a microprocessor or other logic located in the outside mirror. In the implementation depicted in FIG. 1b, diodes D1 and D4, resistor R15, and capacitors C8 and C4 form a voltage regulator 104 for this purpose. It will be appreciated, however, that certain types of loads do not require logic and can be operated directly from the point labelled LED_POWER. Examples of these types of loads include, for instance, puddle lamps, turn indicators, and preamplifiers.

An optional preamplifier 106 in the outside mirror facilitates the use of relatively inexpensive twisted pair wiring for RF reception. If bidirectional RF transmission is desired, a switching diode or other switch can be used to bypass the preamplifier during transmissions from the inside mirror. One example of an application that would benefit from this arrangement is a garage door opener transmitter located in the inside mirror combined with a remote keyless entry system.

In the outside mirror module, an operational amplifier U2 and its associated circuitry, indicated by the dashed lines on FIG. 1b, form a data comparator 108 used to detect power interruptions. This comparator 108 can be implemented using, for example, a microprocessor or a dedicated logic circuit. A resistor R3 and a transistor Q3 form a current source 110, which is used to transmit data from the outside mirror 105 to the mirror communication system 103.

A DC blocking and matching network 112 formed by capacitors C15 and C1 and inductor L1 isolates the power and data signals from the electrochromic element. The capacitor C15 performs DC blocking and RF coupling. The inductor L1 and the capacitor C1 form an RF matching network to match the antenna, which is implemented here as the electrochromic element. It will be understood that other antenna structures such as a one-quarter wave or helical structure could be used in the outside mirror as well. While FIG. 1b depicts a particular topology for implementing the matching network 112, it will be appreciated by those skilled in the art that any of a variety of conventional matching network topologies can be used to implement the matching network 112. Topologies other than the one depicted in FIG. 1b may be appropriate in certain application environments, e.g., particular combinations of loss requirements, antennas, and transmission lines.

The mirror communication system 103 and the outside mirror circuit 105 are connected using an interface 114. In the embodiment shown in FIGS. 1a and 1b, the interface 114 is implemented using a 50-ohm coaxial cable W1. It should be noted, however, that the interface 114 could be implemented using other alternative conductors, including, but not limited to, twisted pair, single wire with chassis ground, or other wiring.

Figure 2:
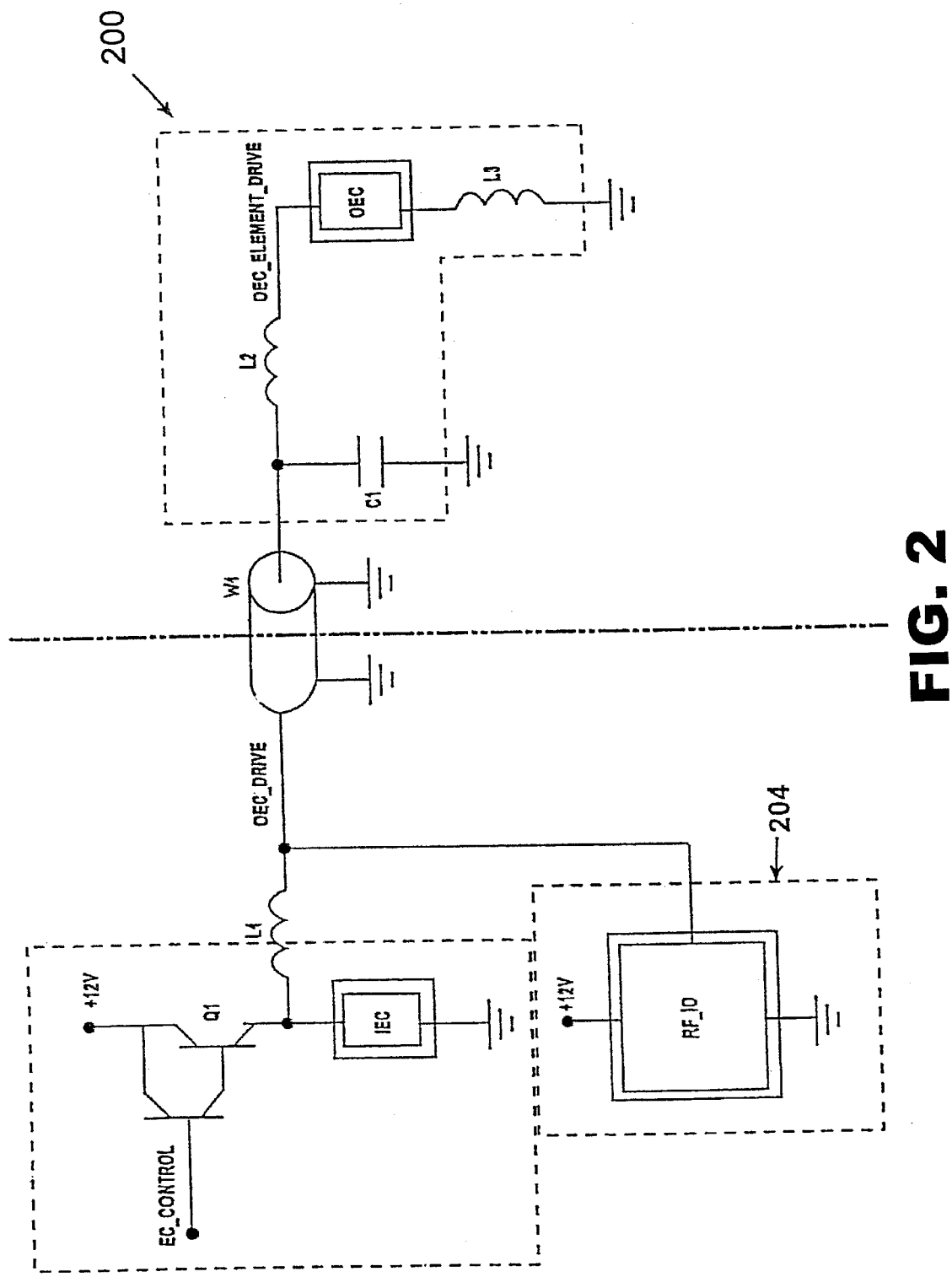
FIG. 2 is a schematic diagram illustrating a mirror communication system according to a second embodiment of the present invention.

Another example circuit arrangement for implementing the mirror communication system is illustrated in FIG. 2. The arrangement of FIG. 2 is considerably simpler than the system shown in FIGS. 1a and 1b. In this embodiment, the transmitter, the receiver, or both are located inside the vehicle, preferably inside of the rearview mirror assembly. The only circuitry located in the outside mirror is an optional matching network 200, which includes a capacitor C1 and inductors L2 and L3. Electrochromic drive is supplied to the electrochromic element using the RF transmission line. As with the embodiment depicted in FIGS. 1a and 1b, any of a variety of matching network topologies can be used to implement the matching network 200.

By using a single conductor combined with a chassis ground to transmit data and power to and from the outside mirror module, the number of electrical wires is reduced compared to that used with conventional electrochromic mirror systems. Further, using the outside mirror modules as antennas is particularly advantageous in vehicles in which a low-E metallic window coating shields RF transmission from the interior of the vehicle to the exterior. Moreover, vehicle security is enhanced because the vehicle bus is retained within the vehicle interior.

The various embodiments described above are provided by way of illustration only and should not be construed to limit the invention. For example, it will be understood that the interior mirror can be on the vehicle bus itself, without the bus extending to the outside mirror. Moreover, the system is equally adaptable to the use of multiple outside mirrors, for example, where there is a driver's side and a passenger side rearview mirror. And, of course, the invention is not so limited to the outside mirrors. Any functional module outside the vehicle that is responsive to communication from a module inside the vehicle can benefit for the simple bi-directional communication arrangement described herein. Those skilled in the art will readily recognize various modifications and changes that can be made to these embodiments without strictly following the example embodiments and applications illustrated and described herein, and without departing from the true spirit and scope of the present invention, which is set forth in the following claims.

What is claimed is:

1. For use in a vehicle, a communication circuit for communicating data signals between a location inside the vehicle and a rearview mirror assembly located outside the vehicle, the communication arrangement comprising:

a power conductor configured and arranged to deliver electrical power to a first module located in said outside rearview mirror assembly;

a control circuit, responsive to a second module located inside the vehicle, for selectively reducing an amount of electrical power delivered to the first module; and a transmitter circuit inside the second module and configured and arranged to transmit data signals to the first module in response to reduction of the electrical power delivered to the first module.

2. A vehicle communication circuit, according to claim 1, wherein the control circuit is configured and arranged to selectively interrupt the delivery of electrical power to the first module.

3. A vehicle communication circuit, according to claim 1, wherein the control circuit is configured and arranged to modulate the amount of electrical power delivered to the first module between a first voltage level and a second voltage level, wherein said second voltage level is lower than the first voltage level, the second voltage level being delivered when information is transmitted from the second module to the first module.

4. A vehicle communication circuit, according to claim 1, further comprising a capacitor, coupled to the first module, configured and arranged to provide electrical power to the first module upon activation of the control circuit.

5. A vehicle communication circuit, according to claim 1, further including means for modulating a second electrical data signal transmitted from the first module to the second module.

6. A vehicle communication circuit, according to claim 1, further comprising a voltage regulator circuit, configured to provide power to logic circuitry located in the first module.

7. A vehicle communication circuit, according to claim 1, further comprising a DC blocking and matching network for isolating power and data signals from an electrochromic element within the first module.

8. A vehicle communication circuit according to claim 1 wherein one of the first and second modules is a mirror module.

9. A vehicle communication circuit for communicating information between a location inside a vehicle and a rearview mirror assembly located outside the vehicle, the vehicle communication circuit comprising:
  a power conductor configured and arranged to deliver electrical power to a first module located in said outside rearview mirror assembly;
  a transistor circuit, responsive to a control signal, for selectively interrupting the delivery of electrical power delivered to the first module;
  a capacitor, coupled to the first module, configured and arranged to provide electrical power to the first module upon interruption of the delivery of electrical power;
  a transmitter circuit, located within a second module inside the vehicle and configured and arranged to transmit information to the first module in response to interruption of delivery of the electrical power; and
  a DC blocking and matching network for isolating power and data signals from an electrochromic element within the first module.

10. A vehicle communication circuit according to claim 9 wherein one of the first and second modules is a mirror module.

11. A vehicle communication circuit according to claim 9 wherein one of the first and second modules is a mirror module.

12. For use in a vehicle, a communication system for communicating data signals between a location inside the vehicle and a rearview mirror assembly located outside the vehicle, the communication system comprising:
  a power conductor configured and arranged to deliver electrical power to a first module located in said outside rearview mirror assembly;
  means responsive to a second module located inside the vehicle, for selectively altering the amount of electrical power delivered to the first module along said power conductor; and
  transmitter means for transmitting, along said power conductor to the first module, an electrical data signal in response to the altering of the electrical power delivered to the first module.

13. A communication system, according to claim 12, wherein the altering means is configured and arranged to selectively interrupt the delivery of electrical power to the first module.

14. A communication system, according to claim 12, wherein the altering means is configured and arranged to modulate the amount of electrical power delivered to the first module between a first voltage level and a second voltage level, wherein the second voltage level is lower than the first voltage level, wherein the second voltage level is established when said electrical data signal is transmitted from the second mirror module to the first mirror module.

15. A communication system, according to claim 12, further comprising a capacitor, coupled to the first module, configured and arranged to supply electrical power stored therein to the first module in response to the altering means.

16. A communication system, according to claim 12, further including means for modulating electrical data signals transmitted from the first module to the second module.

17. A communication system, according to claim 12, further comprising a voltage regulator circuit, configured and arranged to provide power to logic circuitry located in the first module.

18. A communication system, according to claim 12, further comprising a DC blocking and matching network for isolating emanating data signals from an electrochromic element within the first module.

19. A communication system for communicating data signals between a location inside a vehicle and a rearview mirror assembly located outside the vehicle, the communication system comprising:
  a power conductor configured and arranged to deliver electrical power to a first module located in said outside rearview mirror assembly;
  means for selectively interrupting the delivery of electrical power delivered to the first module;
  electrical storage means for providing electrical power to the first module upon interruption of the delivery of electrical power;
  transmitter means for transmitting electrical data signals to the first module in response to interruption of delivery of the electrical power; and
  a DC blocking and matching network for isolating data signals from an electrochromic element within the first module.

20. A vehicle communication circuit according to claim 19 wherein one of the first and second modules is a mirror module.

* * * * *

UNITED STATES PATENT AND TRADEMARK OFFICE
CERTIFICATE OF CORRECTION

PATENT NO. : 6,229,435 B1
DATED : March 8, 2001
INVENTOR(S) : Robert C. Knapp et al.

It is certified that error appears in the above-identified patent and that said Letters Patent is hereby corrected as shown below:

Column 5,
Line 47, "one" should be -- both --.
Lines 47 and 48, "is a mirror module" should be -- are mirror modules --.

Signed and Sealed this

Twenty-seventh Day of November, 2001

Attest:

*Attesting Officer*

NICHOLAS P. GODICI
*Acting Director of the United States Patent and Trademark Office*